J. C. POTTER.
TURRET LATHE.
APPLICATION FILED JULY 1, 1914.
1,268,386.
Patented June 4, 1918.
2 SHEETS—SHEET 1.
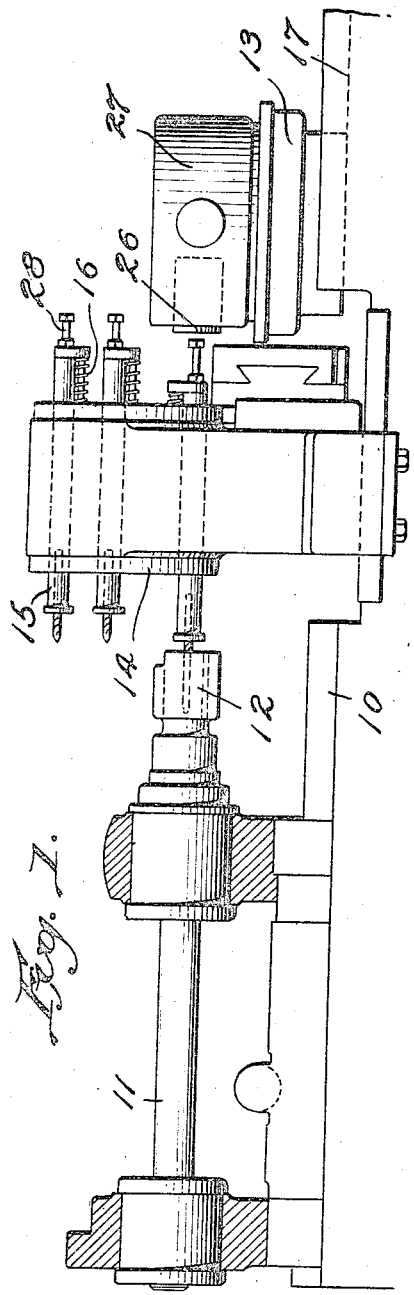
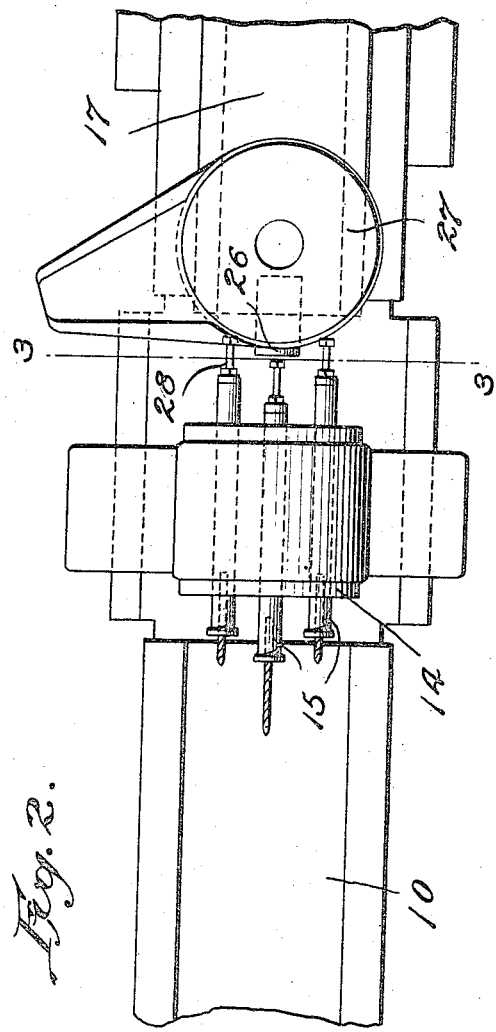

J. C. POTTER.
TURRET LATHE.
APPLICATION FILED JULY 1, 1914.
1,268,386.
Patented June 4, 1918.
2 SHEETS—SHEET 2.
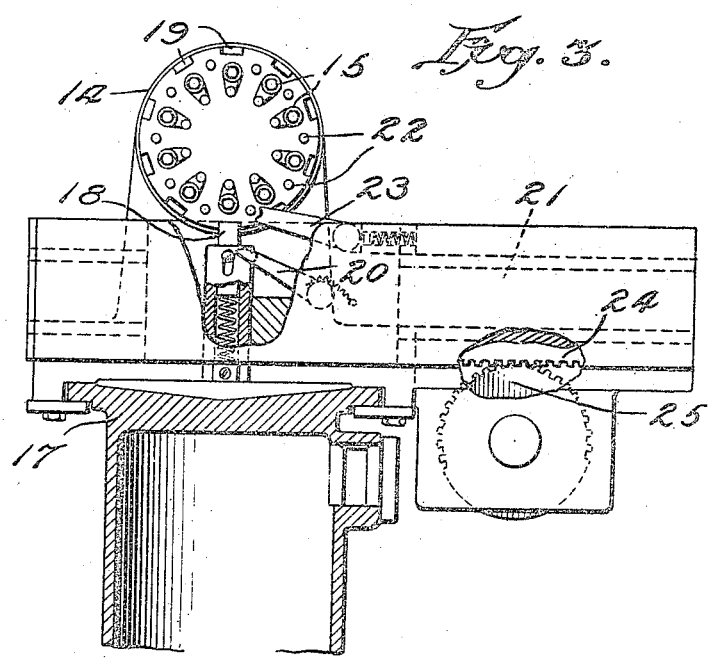
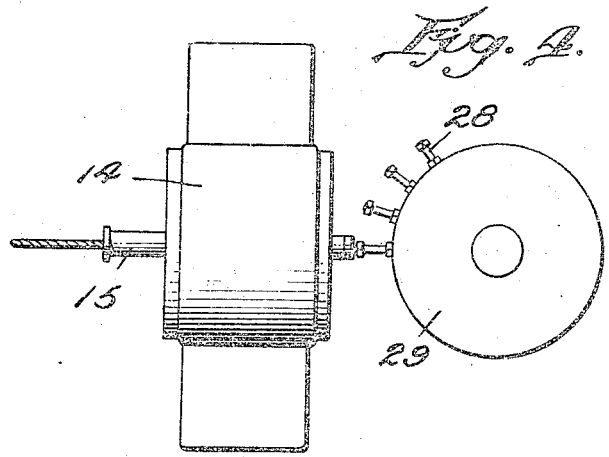
Witnesses
C. S. Timmerman
A. P. Hayes
Inventor
James C. Potter
By Chas. F. Williamson
Attorney

UNITED STATES PATENT OFFICE.

JAMES C. POTTER, OF PAWTUCKET, RHODE ISLAND.

TURRET-LATHE.

1,268,386.  Specification of Letters Patent.  Patented June 4, 1918.

Application filed July 1, 1914. Serial No. 848,414.

*To all whom it may concern:*

Be it known that I, JAMES C. POTTER, of Pawtucket, in the county of Providence and in the State of Rhode Island, have invented a certain new and useful Improvement in Turret-Lathes; and do hereby declare that the following is a full, clear, and exact description thereof.

My invention relates to machines wherein a series of tools adapted for successive operation are employed, and it is particularly adaptable to screw machines, or turret lathes, and my object is to enable the performance of work of a character which cannot be done by such machines as heretofore constructed, and with this object in view my invention consists in the machine having the construction substantially as hereinafter specified and claimed.

In the accompanying drawings—

Figure 1 is a view partly in side elevation and partly in longitudinal section of enough of a turret lathe to illustrate one embodiment of my invention;

Fig. 2 is a top plan view thereof;

Fig. 3 is a cross section on the line 3—3 of Fig. 2;

Fig. 4 is a top plan view showing a different embodiment of my invention.

Generally described my invention comprehends the use of a series of longitudinally slidable tool carriers, and means for reciprocating them in their support, or holder, which preferably is a revolving turret so that one after another each does its allotted operation upon the work carried by a revolving chuck, or holder, and as will be evident, my invention having this general characteristic may be embodied in various forms, or mechanism.

Describing the form of my invention shown in Figs. 1, 2 and 3, there is shown a turret lathe having a bed, or frame 10 upon the top of which at one end is mounted a work spindle 11, made tubular or hollow for the passage of the stock to be operated upon, and carrying at its inner end a suitable chuck 12, and said bed having on its top near its other end a reciprocating slide 13 which occupies the position of the turret slide in turret lathes, or automatic chucking machine of well known construction and such as forms the subject of patents which have been obtained by me, such as No. 1,115,972, dated Nov. 3rd, 1914. Said slide, indeed, might be a turret slide carrying a turret mounted thereon to revolve on a vertical axis, and in the case of the machine shown, while said slide carries a turret 13, the latter is not a revolving one. Mounted on the space between the spindle and the slide 13, is a tool-carrying turret 14 mounted to revolve on a horizontal axis, which turret carries a circular series of tool holders 15 in the form of rods or spindles that are slidably mounted in the turret and are normally held yieldingly in a retracted position by a coil spring 16 provided for each tool carrier, each tool carrier in succession being presented to an actuating device, when by the rotation of the turret it alines with the spindle axis by which it is moved against the action of its spring for the performance of work upon the piece carried by the spindle chuck. Obviously the axis of rotation of the turret to one side of the spindle axis to an extent corresponding with the radius of the circle of the series of tool holders. The turret is journaled in bearings in a block or slide 17 mounted upon the machine bed so that it may be adjusted toward and from the spindle chuck, and suitable mechanism, which may be of any desired construction, such for example as the Geneva stop, is provided for rotating the turret step by step and locking it in its successive positions during the reciprocation of a tool carrier I show in Fig. 3, a turret locking and rotating mechanism, which may be used, the locking mechanism consisting of a spring-held bolt 18 which engages detent notches 19 in the periphery of the turret, and the rotating mechanism consisting of a spring-held pawl 20 which is carried by a reciprocating bar 21 and acts upon pins or studs 22 mounted on the turret. The feeding pawl reciprocating bar 21 also carries a spring held pawl 23 which engages a pin or projection on the locking bolt before the feeding pawl engages a turret pin, or stud 22, so as to effect the release of the turret before the feeding pawl begins to turn the turret. The bar 21 is reciprocated by suitable connections with a cam drum mounted on the shaft journaled in the bed of the machine and which receives motion from a suitable source, which connections include a rack 24 on the underside of the bar 21 and a pinion 25 meshing with said rack, the pinion being oscillated from said cam drum.

An important feature of my invention is a graduated traverse of the several tool carriers. Thus, considering the case of drilling holes of small diameter, the various tool carriers will be supplied with similar drills and a portion of the hole will be cut by the first drill, which after making its cut will be retracted and the second drill will take up the work at the point left off by the first and complete its operation of the work and then be retracted and so on through the series of drills, the result being that a hole is drilled which has a length many times the length of the travel of one drill. This, in the instance given makes it possible automatically to bore long holes of small diameter where the size of the drill is so small that it is not possible to use oil under heavy pressure, which in ordinary cases is necessary to relieve by a flushing out operation the point of the drill from the chips. Giving each drill or boring tool, a short feed and then retracting it, the drill as it is withdrawn brings out the chips it cuts and as oil is used the chips as brought out are washed off by the stream of oil so that the drills are thus kept free from chips when they enter the hole and, of course, are well lubricated.

The tool holder actuating device by which the feeding movement of each tool in succession is produced, consists of a block or plug 26 set in the non-rotating turret 27, shown in Figs. 1, 2 and 3, which as the slide 13 is advanced engages a suitable bearing upon the tool carrier that projects from the tool turret, on the side opposite where the tools are located and preferably said bearing is adjustable and may consist of a small bolt, or screw 23 engaging a threaded opening in the tool holder. Thus the screws of the successive holders may be adjusted graduated distances with reference to the point in the travel of the slide 13 when they are engaged by the turret plug 24 so that said screws will be engaged at points successively nearer and nearer their turret and thus the successive tools will engage the piece and begin their part of the work at points successively farther and farther along.

In the form of my invention shown in Fig. 4, the tool carrier actuating device is in the form of a rotatable turret 29 mounted on the reciprocating slide 13, and instead of mounting the screws, or bolts upon the spindle, as in the construction shown in Figs. 1 to 3, similar screws 29 are mounted to extend radially from the side of the turret at graduated distances from the turret center and by the revolution of said turret, said screws are brought in succession into alinement with tool carrier which is in position to be operated for the performance of its work.

Obviously in connection with the tools for producing or acting upon the hole of a piece of work, other tools may be provided for machining the outer periphery of cylindrical pieces so that the hole operations and the external operations may be carried on simultaneously. It is also apparent that a cross slide may be provided which will carry forming and cutting off tools so that the machine can be used to make studs and bolts from the bar which is fed through the spindle by customary devices and hence my invention may be embodied in machines for doing the customary work of a regular automatic screw machine.

Having thus described my invention what I claim is—

1. In a metal working machine, the combination of a single work spindle, a series of tools arranged for successive action upon the same piece of work carried by the spindle, a carrier for said tools movable to place the same into and out of position to operate on a piece on the work spindle, a support for the tools that is stationary during the movement of the tools, and means to move the tools different distances.

2. In a metal working machine, the combination of a single work spindle, a series of tools arranged for successive action upon the same piece of work carried by the spindle, a carrier for said tools movable to place the same into and out of position to operate on a piece on the work spindle, a support for the tools that is stationary during the movement of the tools, and means to move the tools different distances, consisting of a slide having a fixed range of travel, and tool carriers having slide engaging points situated at graduated distances with reference to the limit of travel of the slide.

3. In a metal working machine, the combination of a single work spindle, a circular series of tool holders for similar tools arranged for successive action upon the same piece of work carried by the spindle, a turret mounted on an axis parallel with that of the work spindle, and supporting said tool holders to reciprocate parallel with its axis, said turret being stationary during the movement of the tools, and means to move the tools different distances with reference to the work.

4. In a metal working machine, the combination of a single work spindle, a circular series of tool holders for similar tools arranged for successive action upon the same piece of work held by the spindle, a turret mounted on an axis parallel with that of the work spindle, and supporting said tool holders to reciprocate parallel with its axis, said turret being stationary during the movement of the tools, and a reciprocating slide having a fixed range of travel, said tool carriers having slide-engaging points situated at graduated distances with reference to the limit of travel of the slide.

5. In a metal working machine, the combination of a single work spindle, a series of similar tools arranged for successive action upon the same piece of work carried by the spindle, a carrier for said tools movable to place the same into and out of position to operate on a piece on the work spindle, a support for the tools that is stationary during the movement of the tools, and means to move the tools different distances.

6. In a metal working machine, the combination of a single work spindle a series of similar tools arranged for successive action upon the same piece of work carried by the spindle, a carrier for said tools movable to place the same into and out of position to operate on a piece on the work spindle, a support for the tools that is stationary during the movement of the tools, and means to move the tools different distances, consisting of a slide having a fixed range of travel, and tool carriers having slide engaging points situated at graduated distances with reference to the limit of travel of the slide.

In testimony that I claim the foregoing I have hereunto set my hand.

JAMES C. POTTER.

Witnesses:
MITCHELL ADAMS,
ELVERY LINGARD.

Copies of this patent may be obtained for five cents each, by addressing the "Commissioner of Patents, Washington, D. C."